(12) United States Patent
Nam et al.

(10) Patent No.: US 8,937,690 B2
(45) Date of Patent: Jan. 20, 2015

(54) LIQUID CRYSTAL DISPLAY DEVICE HAVING TOUCH PANEL

(71) Applicant: LG Display Co., Ltd., Seoul (KR)

(72) Inventors: Seunghee Nam, Paju (KR); Woosup Shin, Paju (KR); Soonsung Yoo, Goyang (KR); Namkook Kim, Suwon (KR)

(73) Assignee: LG Electronics Inc., Seoul (KR)

(*) Notice: Subject to any disclaimer, the term of this patent is extended or adjusted under 35 U.S.C. 154(b) by 30 days.

(21) Appl. No.: 13/689,448

(22) Filed: Nov. 29, 2012

(65) Prior Publication Data

US 2013/0135540 A1 May 30, 2013

(30) Foreign Application Priority Data

Nov. 30, 2011 (KR) .................. 10-2011-0127176

(51) Int. Cl.
| | |
|---|---|
| G02F 1/1335 | (2006.01) |
| G02F 1/1333 | (2006.01) |
| G06F 3/041 | (2006.01) |
| G02F 1/1362 | (2006.01) |
| G02F 1/1343 | (2006.01) |

(52) U.S. Cl.
CPC ...... *G02F 1/136286* (2013.01); *G02F 1/13338* (2013.01); *G06F 3/0412* (2013.01); *G02F 1/134363* (2013.01)

USPC .............................. 349/12; 349/110; 345/173

(58) Field of Classification Search
USPC ............................................................ 349/12
See application file for complete search history.

(56) References Cited

U.S. PATENT DOCUMENTS

| | | | |
|---|---|---|---|
| 2012/0081330 A1* | 4/2012 | Park et al. ...... | 345/174 |
| 2012/0105381 A1* | 5/2012 | Lee et al. ...... | 345/176 |
| 2012/0105752 A1* | 5/2012 | Park et al. ...... | 349/33 |
| 2012/0113027 A1* | 5/2012 | Song et al. ...... | 345/173 |
| 2012/0113339 A1* | 5/2012 | Park et al. ...... | 349/33 |

* cited by examiner

*Primary Examiner* — Dennis Y Kim
(74) *Attorney, Agent, or Firm* — Birch, Stewart, Kolasch & Birch, LLP

(57) ABSTRACT

A liquid crystal display device including a touch panel having a simple structure and minimized thickness is provided. The liquid crystal display (LCD) device according to an embodiment includes a liquid crystal panel and a touch panel structure. The liquid crystal panel includes a thin film transistor (TFT) array substrate, a color filter substrate having a black matrix therein, and a liquid crystal layer disposed between the TFT array substrate and the color filter substrate. The touch panel structure includes at least one touch sensor. Each touch sensor includes a first electrode disposed within the liquid crystal panel, and a second electrode disposed outside the liquid crystal panel.

18 Claims, 5 Drawing Sheets

LIQUID CRYSTAL DISPLAY DEVICE HAVING TOUCH PANEL

The present invention relates to and claims priority of the subject matter contained in Korean Patent Application No. 10-2011-0127176 filed on Nov. 30, 2011 in Republic of Korea, which is herein expressly incorporated by reference in its entirety.

BACKGROUND OF THE INVENTION

1. Field of the Invention

The present invention relates to a liquid crystal display device and, more particularly, to a liquid crystal display device having a touch panel.

2. Description of the Related Art

Recently, as various portable electronic devices such as mobile phones, PDAs, notebook computers, and the like, and large electronic devices have been developed, the demand for lighter, thinner, shorter, and smaller flat panel display devices has been on the rise. Liquid crystal displays (LCDs), plasma display panels (PDPs), field emission displays (FEDs), vacuum fluorescent displays (VFDs) have been actively researched as flat panel display devices.

Meanwhile, personal computers, portable communication devices, and other personal-dedicated information processing devices generally configure interfacing with users by using various input devices such as a key board, a mouse, a digitizer, and the like. However, as portable electronic devices have been advanced, user-inputting cannot be performed on some portable electronic devices by using the input devices such as a key board, a mouse, or the like, and a touch panel allowing the user to directly touch a screen with his hand, a stylus pen, or the like, to input information has been proposed.

According to a method of sensing a contact portion (or a touched portion), a touch panel is classified into a resistive type touch panel, a capacitive type touch panel and an electromagnetic type touch panel. The resistive type touch panel senses a touched position on the screen based on a change in a current according to a resistance in a state in which a DC voltage is applied to a metal electrode formed on an upper plate or a lower plate. The capacitive type touch panel senses a position of an upper or lower plate in which a voltage is changed according to a contact or a touch applied thereto by forming an equipotential on a conductive film. The electromagnetic type touch panel senses a touched position on the screen by reading an LC value induced as an electronic pen comes in contact with a conductive film, and the like.

Touch panels are convenient to use and easy to carry around since they allow text inputs without the necessity of an input device. Such touch panels have recently been applied to various information processing devices and are becoming popular among various users.

FIG. 1 is a cross-sectional view of a related art touch panel-mounted liquid crystal display (LCD) device.

As illustrated in FIG. 1, the related art touch panel-mounted LCD device includes a liquid crystal panel 10 for displaying an image, a touch panel 20 for sensing touches to the panel 20 when a user touches a certain region and transferring position information corresponding to the touched portions, and a bonding layer 30 for bonding the liquid crystal panel 10 and the touch panel 20. The bonding layer 30 is disposed between the liquid crystal panel 10 and the touch panel 20. First and second polarizers 14a and 14b can be provided on the bottom and top surfaces of the liquid crystal panel 10, respectively. Here, a tempered substrate (or an enhanced, reinforced, strengthened substrate) 50 is disposed on an upper portion of the touch panel 20 to prevent damage to the touch panel 20 due to any collision with the exterior and other external factors.

The liquid crystal panel 10 is composed of: a first substrate structure 11 including data lines, gate lines, thin film transistors (TFTs) and various electrodes such as pixel electrode, or the like, formed therein; a second substrate structure including a color filter layer formed therein; and a liquid crystal layer 13 formed between the first substrate 11 and the second substrate 12. The first and second substrate structures 11 and 12 are also referred to as a TFT array substrate and a color filter substrate, respectively.

The touch panel 20 includes a transparent support substrate 21, a plurality of first electrodes 22 formed to be spaced from one another by a certain interval under a lower surface of the transparent support substrate 21, a first insulating layer 23 formed below the entire lower surface of the transparent support substrate 21 including the plurality of first electrodes 22, a plurality of second electrodes 24 formed to be spaced apart from one another by a certain interval and extending in a direction perpendicular to the plurality of first electrodes 22 below the first insulating layer 23, and a second insulating layer 25 formed below the entire surface of the first insulating layer 23 including the plurality of second electrodes 24.

Here, the plurality of first electrodes 22 and the plurality of second electrodes 24 are formed to cross each other with the first insulating layer 23 interposed therebetween, and capacitance is formed in the crossings of the first electrodes 22 and the second electrodes 24. The touch panel 20 senses a position in which the capacitance is changed due to a contact with the outside, thereby sensing the contact portion.

The liquid crystal panel 10 and the touch panel 20 having the forgoing structures are bonded by the bonding layer 30. That is, the liquid crystal panel 10 and the touch panel 20 are spaced apart from each other with the bonding layer 30 formed therebetween for bonding the liquid crystal panel 10 having the second polarizer 14b thereon and the touch panel 20 to the bonding layer 30. The tempered substrate 50 is attached to an upper surface of the transparent support substrate 21 of the touch panel 20. As such, a touch panel-mounted LCD device is fabricated.

However, the touch panel-mounted LCD device having the foregoing structures has at least the following problems and limitations.

In the foregoing touch panel-mounted LCD device, the entire touch panel is attached to the outside of the liquid crystal panel and separate from the liquid crystal panel. Thus, when the LCD device is completed, the overall size of the LCD device is increased by the touch panel attached to the outside of the liquid crystal panel. Also, since the touch panel and the liquid crystal panel are fabricated through separate processes, fabrication costs are increased.

In an effort to address these problems, a structure in which the entire touch panel is formed all within or inside a liquid crystal panel has been proposed. In this case, however, signal interference occurs due to a touch wiring, transmittance is degraded due to the touch wiring which degrades the image quality of the LCD device, and the thickness of the liquid crystal panel is increased, which limits the size reduction of the LCD device. In addition, a process of fabricating the liquid crystal panel is complicated.

SUMMARY OF THE INVENTION

An aspect of the present invention provides a liquid crystal display (LCD) device including a touch panel having a simple structure and minimized thickness.

Another aspect of the present invention is to provide a flat panel display device having a touch screen, which addresses the limitations and problems associated with the related art devices.

According to an aspect of the present invention, there is provided a liquid crystal display (LCD) device including: first and second substrates; gate lines and data lines formed on the first substrate and defining a plurality of pixels; thin film transistors (TFTs) formed in respective pixels on a front surface of the substrate; black matrices and color filter layers formed on a front surface of the second substrate; a first metal layer formed along the black matrices on the front surface of the second substrate; a second metal layer formed on a rear surface of the second substrate to form capacitance with the first metal layer, a touched portion being sensed by detecting the variation of the capacitance caused by touch; and a liquid crystal layer formed between the first and second substrates.

The first metal layer may be made of a metal, and the second metal layer may be made of indium tin oxide (ITO) or indium zinc oxide (IZO). The first metal layer may be formed along the black matrices corresponding to the gate lines and data lines or may be formed along the gate lines and the data lines.

According to embodiments of the present invention, one portion of a touch panel is formed within a liquid crystal panel and another portion of the touch panel is formed outside the liquid crystal panel. This allows the LCD device of the present invention to have characteristics between an internal-type touch panel and a mount-type touch panel. As a result, the touch panel according to an embodiment of the present invention can have both the advantages of the internal-type touch panel and the mount-type touch panel. Further, a device fabrication process is simplified and any increase in the thickness of the LCD device is prevented or minimized.

According to an embodiment, the present invention provides a liquid crystal display (LCD) device comprising: first and second base substrates; gate lines and data lines formed on the first base substrate and defining a plurality of pixels; thin film transistors (TFTs) formed in respective pixels; a black matrix and a color filter layer formed under the second base substrate; a first electrode formed below the black matrix and to correspond with at least a part of the black matrix; a second electrode formed on the second base substrate to form a capacitance with the first electrode, wherein a variation of the capacitance is used to detect a touch input to the LCD device; and a liquid crystal layer formed between the first and second base substrates.

According to another embodiment, the present invention provides a liquid crystal display (LCD) device comprising: a liquid crystal panel including: a thin film transistor (TFT) array substrate, a color filter substrate having a black matrix therein, and a liquid crystal layer disposed between the TFT array substrate and the color filter substrate; and a touch panel structure including at least one touch sensor, each touch sensor including: a first electrode disposed within the liquid crystal panel, and a second electrode disposed outside the liquid crystal panel.

The foregoing and other objects, features, aspects and advantages of the present invention will become more apparent from the following detailed description of the present invention when taken in conjunction with the accompanying drawings.

DETAILED DESCRIPTION OF THE EMBODIMENTS

Embodiments of the present invention will be described in detail with reference to the accompanying drawings.

In an embodiment of the present invention, one portion of a touch panel is formed within a liquid crystal panel and the other portion(s) of the touch panel are formed outside the liquid crystal panel. In this case, however, only partial elements of the touch panel are formed within the liquid crystal panel, the touch panel is not substantially an internal-type touch panel in which a touch panel is completely installed in a liquid crystal panel nor a mount-type touch panel in which a touch panel is attached to the outside of the liquid crystal panel. Since some elements of the touch panel are formed within the liquid crystal panel and the other elements of the touch panel are formed outside the liquid crystal panel, the touch panel has characteristics of an internal-type touch panel and/or a mount-type touch panel. In other words, the touch panel according to an embodiment of the present invention has the advantages of both the internal-type touch panel and the mount-type touch panel.

Figure 2:
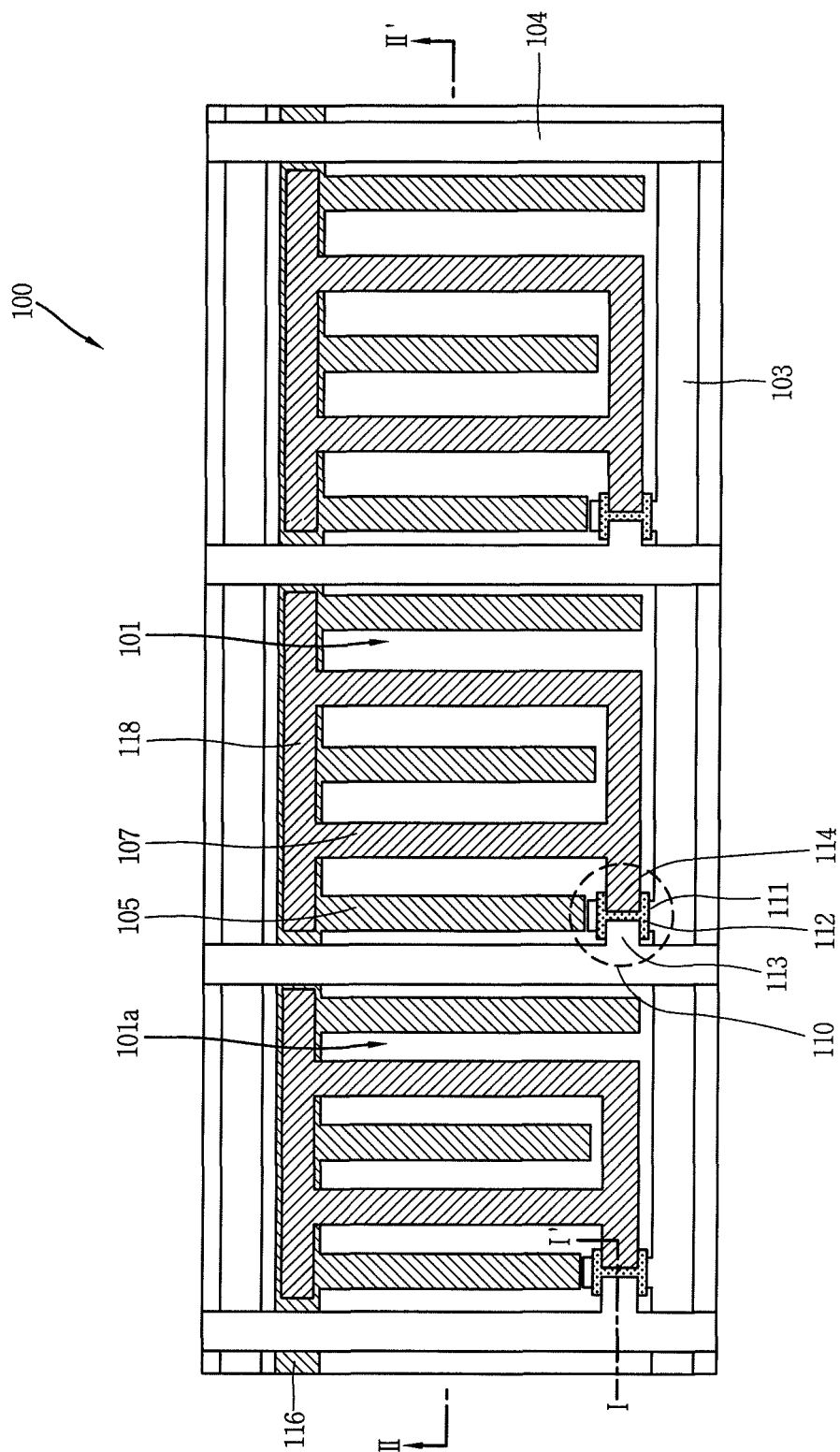
FIG. 2 is a plan view of an LCD device according to an embodiment of the present invention.

FIG. 2 is a plan view illustrating a structure of an LCD device according to an embodiment of the present invention. Here, the LCD device having the illustrated structure is an in-plane switching mode LCD device only as a non-limiting example, but the LCD device according to the embodiments of the present invention is not limited thereto and may be applied to various modes of LCD devices such as a twisted nematic (TN) mode LCD or a vertical alignment (VA) LCD device or other types of LCD devices.

As illustrated in FIG. 2, in the LCD device according to an embodiment of the present invention, thin film transistors (TFTs) are disposed in a plurality of pixels 101 defined by gate lines 103 extending parallel to each other and data lines 104 extending parallel to each other. The gate lines 103 and data lines 104 cross each other to form a matrix configuration, where a TFT 110 is formed at an intersection area of the corresponding gate line 103 and data line 104.

Figure 3A:
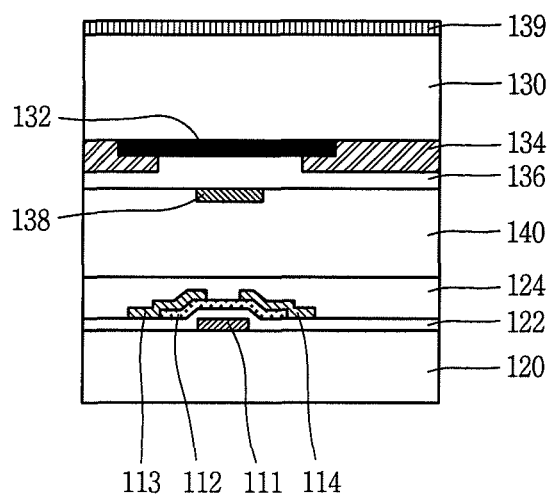
FIG. 3A is a cross-sectional view taken along line I-I' in FIG. 2.

Each of the TFTs 110 includes a gate electrode 111, to which a scan signal is applied from an external driving circuit through the corresponding gate line 103, a semiconductor layer 112 formed on the gate electrode 111 and activated to form a channel layer as the scan signal is applied to the gate electrode 111, and a source electrode 113 and a drain electrode 114 formed on the semiconductor layer 112 and applying an image signal provided from the external driving circuit through the data line 104 to a liquid crystal layer (140 in FIG. 3A).

A common electrode 105 and a pixel electrode 107 are arranged to be substantially parallel to each other in each of the plurality of pixels 101. The common electrode 105 is connected to a common line 116 disposed in the pixel and the pixel electrode 107 is connected to a pixel electrode line. When a signal is applied from a driving circuit, an in-plane field is formed between the common electrode 105 and the pixel electrode 107. Here, as illustrated, the common line 116 and the pixel electrode line 118 overlap in the pixels 101 to form capacitance.

The LCD device according to the embodiments of the present invention, including the LCD device of FIG. 2, further includes other components known in the art for the operation of the LCD device. For instance, the LCD device may further include driving circuits and a backlight unit.

Figure 3B:
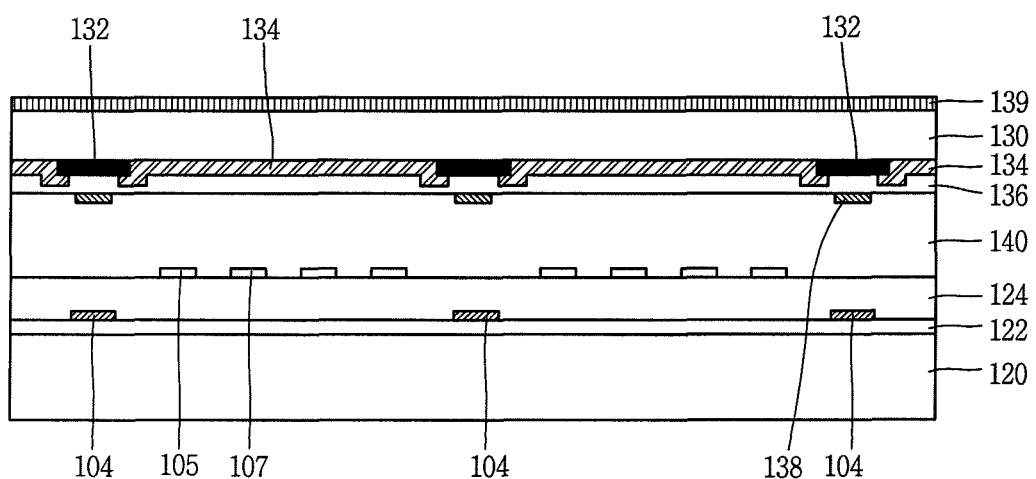
FIG. 3B is a cross-sectional view taken along line II-II' in FIG. 2.

FIG. 3A is a cross-sectional view taken along line I-I' in FIG. 2, and FIG. 3B is a cross-sectional view taken along line II-II' in FIG. 2. FIG. 3A shows a structure of a TFT of the LCD device of FIG. 2, and FIG. 3B shows a structure of a pixel of the LCD device of FIG. 2.

As illustrated in FIGS. 3A and 3B, the LCD device includes a liquid crystal panel and a touch panel integrally formed therein, at least in part. In the liquid crystal panel of the present invention, the gate electrode 111 is formed on a first base substrate 120 made of a transparent material such as glass, and a gate insulating layer 122 is stacked on the entire first base substrate 120 with the gate electrodes 111 formed thereon. The semiconductor layer 112 is formed on the gate insulating layer 122, and the source and drain electrodes 113 and 114 are formed on the semiconductor layer 112. Also, a passivation layer 124 is formed on the entire first base substrate 120.

For each of the TFTs, the gate electrode 111 is formed by stacking an opaque metal having excellent conductivity such as Cr, Mo, Ta, Cu, Ti, Al or an Alloy through sputtering and performing etching thereon through photolithography. The gate insulating layer 122 is formed by stacking an inorganic insulating material such as $SiO_2$ or SiNx on the entirety of the first base substrate 120 through chemical vapor deposition (CVD). The gate lines 103 are also formed on the first base substrate 120 when the gate electrode 111 is formed.

The semiconductor layer 112 is formed by stacking a semiconductor material such as amorphous silicon (a-Si) on the entirety of the first base substrate 120 through CVD, and performing etching thereon. Here, although not shown, an ohmic-contact layer is formed on the semiconductor layer 112.

The source electrode 113 and the drain electrode 114 are formed by stacking an opaque material having excellent conductivity such as Cr, Mo, Ta, Cu, Ti, Al, or an Al alloy on the first base substrate 120 through sputtering and subsequently performing etching thereon. The passivation layer 124 is formed by stacking an organic insulating material such as BCB (Benzo Cyclo Butene) or photoacryl over the entirety of the first base substrate 120.

The liquid crystal panel of the present invention further includes a second substrate 130, and a black matrix 132 and a color filter layer 134 disposed under the second substrate 130 made of a transparent material such as glass. The black matrix 132 serves to prevent light from being leaked to a non-display region so as to improve image quality. The black matrix 132 is disposed in the region in which the TFT is formed and the region in which the gate line and the data line are formed. For instance, the black matrix 132 having a certain pattern may be formed to correspond with the gate lines 103 and/or data lines 104. The black matrix 132 may be formed by stacking CrO or $CrO_2$ and patterning the same, or may be formed by coating a black resin.

The liquid crystal panel further includes an overcoat layer 136 disposed below the black matrix 132 and the color filter layer 134. The overcoat layer 136 is formed by stacking an organic material such as a transparent resin, or the like, to planarize a surface of the second base substrate 130 having the black matrix 132 and color filter layer 134 disposed therebelow. The liquid crystal layer 140 is provided between the first and second base substrates 120 and 130 to form the liquid crystal panel of the LCD device.

The LCD device of the present invention further includes the touch panel including a plurality of touch sensors formed with a first electrode 138 and a second electrode 139 for detecting touches to the LCD device. The first electrode 138 is disposed in a region corresponding to the black matrix 132 below the overcoat layer 136. That is, the first electrode 138 is formed within or inside the liquid crystal panel, e.g., under the overcoat layer 136 and the second base substrate 130 of the liquid crystal panel. The first electrode 138 as disposed corresponds to the location of the black matrix 132 and is separated from the black matrix 132 by the overcoat layer 136. The first electrode 138 can be formed by stacking Cr, Mo, Ta, Cu, Ti, Al, or an Al alloy having excellent conductivity and performing etching thereon.

As such, according to the present invention, the first electrode 138 of the touch panel is now formed between the first and second base substrates 120 and 130 of the liquid crystal panel, i.e., within the liquid crystal panel structure. This feature of the invention is completely opposite to the feature of the related art LCD device where the entire touch panel of the LCD device is disposed outside the liquid crystal panel of the LCD device.

Figure 1:
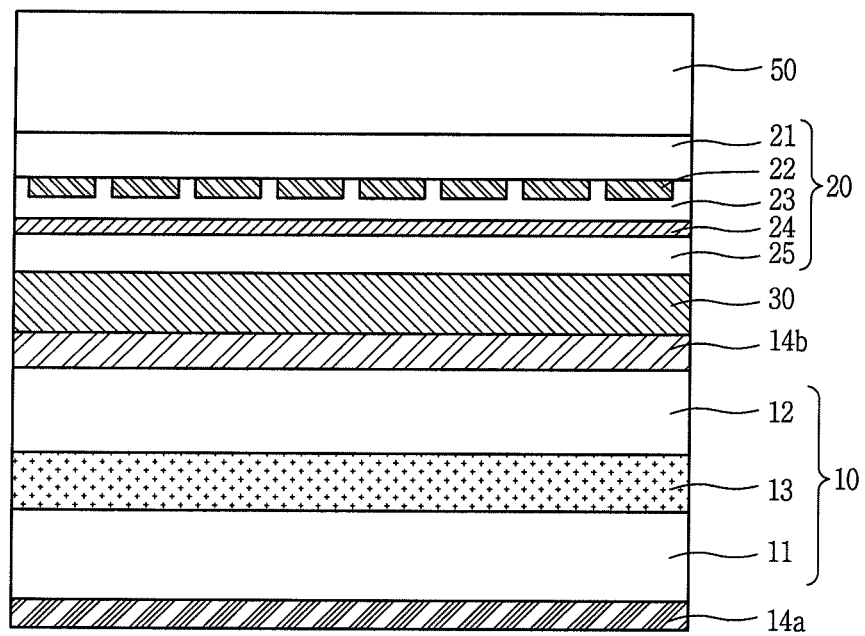
FIG. 1 is a cross-sectional view illustrating a structure of a related art liquid crystal display (LCD) device.

Further according to the LCD device of the present invention, the second electrode 139 of the touch panel is formed directly on an upper surface of the second base substrate 130 of the liquid crystal panel. That is, the second electrode 139 of the touch panel is formed outside the liquid crystal panel of the LCD device. This is contrary to the related art LCD device of FIG. 1 where the second electrode 24 is formed directly on the insulating layer 25 of the touch panel. The second electrode 139 can be formed by stacking a transparent conductive material such as ITO or IZO and etching the same.

The second electrode 139 forms the touch panel structure of the LCD device together with the first electrode 138. As such, capacitance is formed between the first electrode 138 and the second electrode 139, and when a touch is applied, capacitance therebetween is changed, so that the touched portion can be sensed by detecting the changed capacitance.

In addition, a first polarizer and a second polarizer can be attached directly to the outer surfaces of the first base substrate 120 and the second electrode 139, respectively. For instance, the top and bottom polarizers can be provided on the top surface of the touch panel and the bottom surface of the liquid crystal panel of the present invention, respectively. The first and second polarizers can be used to polarize light made incident to the liquid crystal panel and light output from the liquid crystal panel to adjust transmittance, thus implementing a desired image.

As illustrated in FIG. 3B, the data line 104 are provided on the gate insulating layer 122. Here, the data line 104 is formed through the same process as that of the source electrode 113 and drain electrode 114 of the TFT.

The plurality of common electrodes 105 and the pixel electrodes 107 are formed to be arranged to be parallel to each other in a band shape on the passivation layer 124. The common electrodes 105 and the pixel electrodes 107 may be formed by stacking a transparent conductive material such as ITO or IZO and etching the same, or may be formed by stacking a metal and etching the same.

In the drawing, both the common electrodes 105 and the pixel electrodes 107 are formed on the passivation layer 124, but the present invention is not limited thereto and both the common electrodes 105 and the pixel electrodes 107 may be formed on the first base substrate 120 or the gate insulating layer 122, or the common electrodes 105 and the pixel electrodes 107 may be separately formed on the first base substrate 120 or the gate insulating layer 122.

As mentioned above, the black matrix 132 is formed in regions corresponding to the data lines 104 to block a light transmission thereto, and the first electrode 138 is formed under the overcoat layer 136 corresponding to the black matrix 132. The gate lines 103 are formed on the first base substrate 120, and the black matrix 132 is also formed under the second base substrate 130 corresponding to the gate lines in order to prevent a light transmission thereto. The first electrode 138 is also formed in regions corresponding to the black matrix 132 disposed along the gate lines 103.

Preferably, the gate lines 103 and the data lines 104 are arranged in a matrix form such that they are perpendicular to each other on the first base substrate 120, so the black matrix 132 is also arranged in a matrix form under the second base substrate 130 and the first electrode 138 is also arranged in a matrix form (or a mesh form) along (or corresponding to) the black matrix 132. Here, in various examples, the first electrode 138 (e.g., made of metal) may be arranged only along (or corresponding to) the black matrix 132 formed at the regions corresponding to the gate lines 103, or may be arranged along (or corresponding to) only the black matrix 132 formed at the regions corresponding to the data lines 104, or both.

Figure 4:
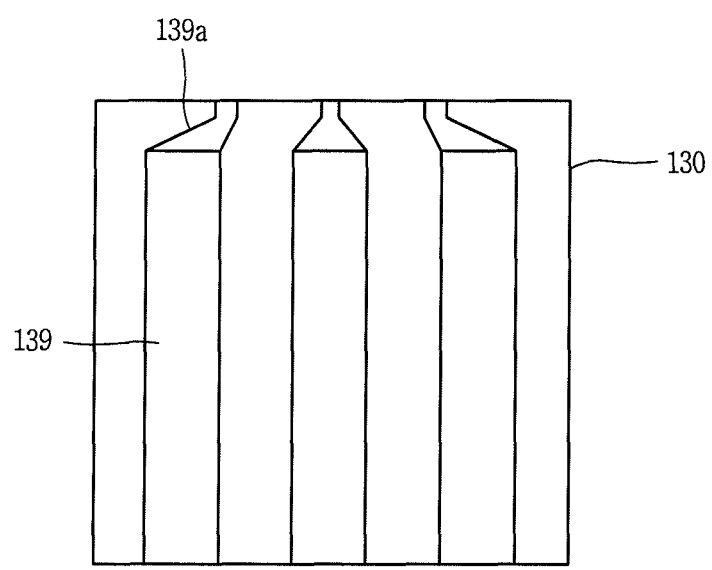
FIG. 4 is a view illustrating a structure of a second metal layer (second electrode layer) of the LCD device according to an embodiment of the present invention.

The second electrode 139 can be formed of a transparent metal layer/material and is formed on an outer/upper surface of the second base substrate 130. FIG. 4 shows a plan view of the second electrode 139 of the touch panel structure of the LCD device of FIG. 2. As such, the second electrode 139 is shown to be on the second base substrate 130.

As illustrated in FIG. 4, the second electrode (e.g., made of metal layer) 139 is arranged to extend to one side in a band or stripe shape. However, the shape of the second electrode 139 is not limited to a particular shape and the second electrode 139 may be formed to have various shapes. Here, the band-like second electrode 139 or the second electrode 139 in stripes (e.g., stripes disposed parallel to each other) may be connected to an external pad by a second wiring 139a to receive a signal or output a signal. In case of a small liquid crystal panel (i.e., a touch panel having a small area), the second wiring 139a may be made of a transparent conductive material, and in case of a large liquid crystal panel, the second wiring 139a is preferably made of a metal layer. The reason for this is because, as the area of the liquid crystal panel (i.e., the area of the touch panel is increased), the length of the second wiring 139a is increased. A transparent conductive material such as ITO or IZO has a great resistance in comparison to a metal, so that if a transparent conductive material were to be used as a material of a wiring of the second electrode 139 for the large liquid crystal panel, such can generate a signal delay due to the resistance.

Also, the second electrode 139 may be used as a rear electrode of an in-plane switching (IPS) mode LCD device. In general, in an IPS mode LCD device, the common electrode 105 and the pixel electrode 107 are formed on the first base substrate 120 and an in-plane field (or a horizontal field) parallel to the surface of the first substrate 120 is applied. As a result, liquid crystal molecules of the liquid crystal layer are switched to be parallel to the surface of the first substrate 120 to control the transmittance of light that transmits through the liquid crystal layer.

However, static electricity is generated in the liquid crystal panel for various reasons. Static electricity is mainly formed on the second base substrate 130 and form a vertical field perpendicular to the common electrode 105 and the pixel electrode 107 formed on the first base substrate 120 and the surface of the first base substrate 120. The vertical field distorts an in-plane field formed on the common electrode 105 and the pixel electrode 107 to hamper liquid crystal molecules from being switching vertically to the surface of the first base substrate 120. This vertical field can degrade the image quality significantly.

Thus, in a general IPS mode LCD device, a static electricity removal rear electrode for removing static electricity formed on the second base substrate 130 is generally formed on an outer/rear surface of the second base substrate 130, namely, on the surface where the color filter layer is not formed.

The present invention addresses this need for the static electricity removal electrode without having to provide a separate static removal electrode. More specifically, in an embodiment of the present invention, since the second electrode 139 is formed on the outer surface of the second base substrate 130, static electricity generated on the second base substrate 130 can be effectively removed without having to form an extra static electricity removal rear electrode. That is, the second electrode 139 as located according to the present invention can function as a static electricity removal rear electrode.

In the LCD device having the configuration as described above according to the embodiments of the present invention, when a pre-set amount of current flows to the second electrode 139, a certain amount of capacitance is generated between the first electrode 138 and the second electrode 139. When a user's finger or the like is brought into a direct or proximity contact with the second electrode 139, capacitance between the first electrode 138 and the second electrode 139 is changed by the capacitance flowing in the human body, and a touched position on or near the touch screen may be detected by detecting the changed capacitance.

In an embodiment, wirings are formed to the first electrode (first metal layer) 138 and the second electrode (second metal layer) 139 to supply a current set for the first electrode 138 and/or the second electrode 139, and a change in the capacitance detected from the first electrode 138 and/or the second electrode 139 is output to thus detect a touched position.

In this manner, in an embodiment of the present invention, the black matrix 132 is arranged on the overcoat layer 136 and the first electrode 138 is provided under the overcoat layer 136 within the liquid crystal panel of the LCD device. Further, the second electrode 139 of the touch panel structure of the LCD device is formed outside the liquid crystal panel, thereby simplifying the manufacturing process and preventing or controlling the thickness of the LCD device from being increased. Also, in an embodiment of the present invention, since the first electrode 138 is formed along the black matrix 132, rather than being formed in the pixels for implementing an image, a degradation of an aperture ratio by the first electrode 138 can be prevented, thus enhancing the aperture ratio of the LCD device of the present invention.

Thus, in an embodiment of the present invention, since the width of the first electrode 138 is narrower than that of the black matrix 132, the black matrix 132 completely covers the first electrode 138 so as to prevent a degradation of the aperture ratio by the first electrode 138 to its maximum level.

Figure 5A:
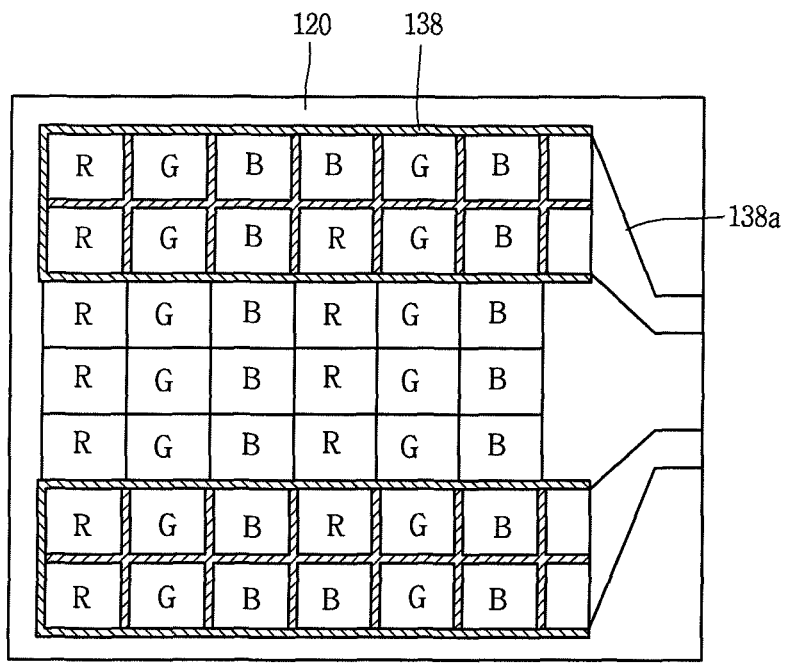
FIG. 5A is a plan view illustrating one example of a structure of a first metal layer (first electrode layer) of the LCD device according to an embodiment of the present invention.
Figure 5B:
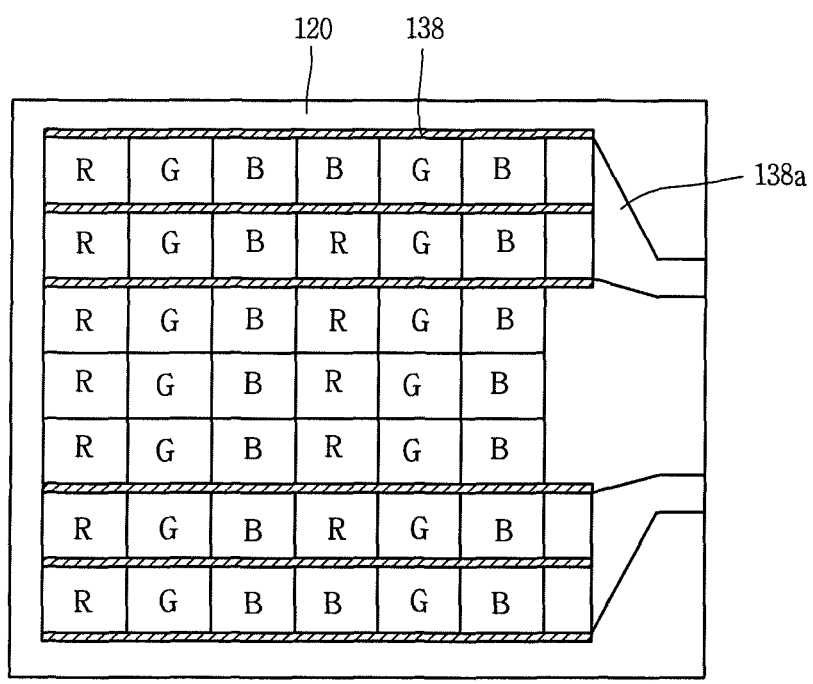
FIG. 5B is a plan view illustrating another example of a structure of a first metal layer (first electrode layer) of the LCD device according to an embodiment of the present invention.

FIGS. 5A and 5B are views illustrating different examples of a structure of the first electrode 138 formed to correspond with at least a part of the pattern of the black matrix 132 in the LCD device of FIG. 2.

In one example as illustrated in FIG. 5A, a plurality of R, G, and B pixels are arranged on the first base substrate 120. The black matrix 132 is formed in a pattern between the plurality of R, G, and B pixels to demarcate the respective R, G, and B pixels. To show the first electrode 138 more clearly, however, the black matrix 132 is not shown in these figures.

The first electrode 138 is provided along the boundaries between the R, G, and B pixels, e.g., to correspond with at least part of the pattern of the black matrix 132 formed between the R, G, and B pixels. Here, the first electrode 138 is formed in a matrix form on the plurality of R, G, and B pixels arranged in a plurality of columns (e.g., two rows in the drawing). That is, the first electrode 138 in this example is formed in a two-row form, and may not correspond with the full pattern of the black matrix 132, such that there may be some pixel boundaries without the first electrode 138 as shown in FIG. 5A.

As illustrated in FIG. 5A, the first electrode 138 having a matrix form formed on the plurality of R, G, and B pixels is connected to a pad by a first wiring 138a so as to act as a touch sensor. Here, the first wiring 138a can be mainly made of a metal or may be made of a transparent conductive material such as ITO or IZO.

A plurality of touch sensors (e.g., including the first and second electrodes 138 and 139) can be selectively formed on the first base substrate 120. In other words, the first metal electrode 138 is formed in a matrix form at certain intervals on the R, G, and B pixels, rather than being formed in a matrix form on all the R, G, and B pixels formed on the first base substrate 120. Thus, the first electrode 138 can be formed only in a pre-set region or on the entire screen area, and only the black matrix 132 is formed in a region which is not previously set, namely, in a region between the touch sensors, and the first electrode 138 may not be formed along the entire pattern of the black matrix 132.

Although the first electrode 138 is formed on the plurality of R, G, and B pixels, it is arranged in the direction of the gate lines 103. In FIG. 5A, the first electrode 138 is arranged in a matrix form to cover two rows of pixels in the direction of the gate lines 103, but the present invention is not limited thereto and the first electrode 138 may be arranged to cover one row or three or more rows in a matrix form in the direction of the gate lines 103. Also, as shown, three rows of R, G, B pixels on which the first electrode 138 is not formed are disposed between the top first electrode 138 and the lower first electrode 138, but one row or two rows of R, G, and B pixels may be disposed or four or more rows of such R, G, and B pixels may be disposed. These are various examples and other examples are possible. Further, although RGB pixels are used, but other color pixels/pixel arrangements can be used.

As a variation, the first electrode 138 may be arranged in the direction of the data lines 104. In other words, the first electrode 138 may be formed in a matrix form on a plurality of columns of R, G, B pixels and arranged along the data lines 104 so as to be connected to a pad through wirings.

As described above, the first electrode 138 formed in a matrix form on the plurality of R, G, and B pixels may be arranged along the gate lines and/or arranged along the data lines. Here, the first electrode 138 may be arranged in any direction as long as they cross or overlap with the second electrode 139.

In another example as illustrated in FIG. 5B, the first electrode 138 arranged along the plurality of gate lines 103 may form a single touch sensor. Unlike the case of FIG. 5A, the first electrode 138 is formed in the shape of strips or stripes, and is not formed in the matrix form on a plurality of rows of R, G, and B pixels. Instead the first electrode 138 is formed only in the region corresponding to the gate lines of the plurality of rows of R, G, and B pixels but is not formed in the region corresponding to the data lines. The plurality of first electrode 138 having a linear line shape or stripe shape can be connected to a single pad by wirings so as to operate as a single touch sensor.

In such a configuration, one touch sensor (e.g., strips of the first electrode 138 arranged along the gate lines) is arranged at a certain interval (namely, a plurality of R, G, and B pixel rows) from an adjacent touch sensor.

Also, the first electrode 138 may be formed along the data lines of a plurality of columns of R, G, and B pixels to form a single touch sensor. Here, the first electrode 138 may be arranged in any direction as long as they cross or overlap with the second electrode 139.

As described above, in the present invention, since the first electrode and the second electrode of the touch panel are formed within and outside of the liquid crystal panel, respectively, the LCD fabrication process can be simplified and the thickness of the LCD device can be effectively controlled to a desired level.

Meanwhile, in the detailed description above, the electrode structure and the touch electrode(s) of the LCD device have particular shapes and/or configurations, but the present invention is not limited thereto. In the embodiments of the present invention, a portion (e.g., first electrode) of the touch panel structure is formed along at least a part of the black matrix within the liquid crystal panel and the other portion (e.g., second electrode) of the touch panel structure is formed outside of the liquid crystal panel. Thus, as long as a portion of a touch electrode structure of the LCD device is formed along the black matrix within the liquid crystal panel of the same LCD device, the present invention is applicable to a liquid crystal panel having any structure and to a touch electrode having any shape.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display (LCD) device comprising:
   first and second base substrates;
   gate lines and data lines formed on the first base substrate and defining a plurality of pixels;
   thin film transistors (TFTs) formed in respective pixels;
   a common electrode formed on the first base substrate;
   a pixel electrode formed on the first base substrate and alternating with the common electrode so as to form an in-plane electric field parallel to a surface of the first base substrate;
   a liquid crystal layer formed on the common electrode and formed under the second base substrate;
   a black matrix and a color filter layer both formed between the second base substrate and the liquid crystal layer;
   a first electrode formed below the black matrix and formed on a top surface of the liquid crystal layer, a width of the first electrode being less than that of the black matrix so that the first electrode is totally covered with the black matrix; and a second electrode formed on the second base substrate to form a capacitance with the first electrode, wherein a variation of the capacitance is used to detect a touch input to the LCD device.

2. The liquid crystal display device of claim 1, wherein the first electrode is made of a metal, and the second electrode is made of indium tin oxide (ITO) or indium zinc oxide (IZO).

3. The liquid crystal display device of claim 1, wherein the first electrode is disposed directly under the black matrix and directly above the at least one of the gate lines and data lines.

4. The liquid crystal display device of claim 1, wherein the first electrode is arranged along the black matrix and substantially aligned with at least one gate line and at least one data line of at least one column or row of pixels to form a touch sensor.

5. The liquid crystal display device of claim 1, wherein the first electrode has a matrix shape.

6. The liquid crystal display device of claim 1, wherein one first electrode forming a single touch sensor is spaced apart by a certain interval from another adjacent first electrode forming a different touch sensor.

7. The liquid crystal display device of claim 6, wherein an interval between the touch sensors corresponds to a plurality of columns of pixels or a plurality of rows of pixels.

8. The liquid crystal display device of claim 1, wherein the second electrode is arranged in a stripe shape having a certain width.

9. The liquid crystal display device of claim 1, wherein at least a portion of the second electrode is arranged to cross or overlap the first electrode to form a single touch sensor.

10. The liquid crystal display device of claim 1, further comprising:
an overcoat layer formed between the black matrix and the first electrode, and being in contact with the liquid crystal layer.

11. The liquid crystal display device of claim 1, wherein the second electrode functions as an electrode for removing static electricity.

12. A liquid crystal display (LCD) device comprising:
a liquid crystal panel including:
a thin film transistor (TFT) array substrate,
a color filter substrate having a black matrix therein,
a liquid crystal layer disposed between the TFT array substrate and the color filter substrate, and
a common electrode formed under the liquid crystal layer; and
a touch panel structure including at least one touch sensor, each touch sensor including:
a first electrode disposed on the liquid crystal panel and disposed below the black matrix, a width of the first electrode being less than that of the black matrix so that the first electrode is totally covered with the black matrix, and
a second electrode disposed outside the liquid crystal panel and formed on the color filter substrate,
wherein the first electrode is not in contact with the common electrode.

13. The LCD device of claim 12, wherein the first electrode is in a shape of a matrix, and is disposed below the black matrix so as to be substantially aligned with at least a part of a pattern of the black matrix.

14. The LCD device of claim 12, wherein a width of the first electrode is less than a width of the black matrix.

15. The LCD device of claim 12, wherein the first electrode is in direct contact with the liquid crystal layer, and the first electrode is disposed directly under the black matrix and directly above at least one of gate lines and data lines provided in the TFT array substrate.

16. The LCD device of claim 12, wherein the first electrode is made of a metal, and the second electrode is made of indium tin oxide (ITO) or indium zinc oxide (IZO).

17. The LCD device of claim 12, wherein the LCD device is an in-plane switching mode LCD device.

18. The LCD device of claim 12, wherein the second electrode functions as an electrode for removing static electricity.

* * * * *

UNITED STATES PATENT AND TRADEMARK OFFICE
CERTIFICATE OF CORRECTION

| | | |
|---|---|---|
| PATENT NO. | : 8,937,690 B2 | Page 1 of 1 |
| APPLICATION NO. | : 13/689448 | |
| DATED | : January 20, 2015 | |
| INVENTOR(S) | : Seunghee Nam et al. | |

It is certified that error appears in the above-identified patent and that said Letters Patent is hereby corrected as shown below:

ON THE TITLE PAGE:

At item (73), Assignee, change:

"(73) Assignee:  LG Electronics Inc., Seoul (KR)"

to:   --(73) Assignee:  LG Display Co., Ltd., Seoul (KR)--.

Signed and Sealed this
Twenty-seventh Day of October, 2015

Michelle K. Lee
*Director of the United States Patent and Trademark Office*